United States Patent
Zhang et al.

(10) Patent No.: US 12,425,667 B2
(45) Date of Patent: Sep. 23, 2025

(54) VIDEO ENCODING METHOD AND APPARATUS, REAL-TIME COMMUNICATION METHOD AND APPARATUS, DEVICE, AND STORAGE MEDIUM

(71) Applicant: Tencent Technology (Shenzhen) Company Limited, Guangdong (CN)

(72) Inventors: Jia Zhang, Shenzhen (CN); Hongbin Cao, Shenzhen (CN); Yongcheng Huang, Shenzhen (CN); Xiaoxiang Yang, Shenzhen (CN); Jian Cao, Shenzhen (CN); Sijia Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 58 days.

(21) Appl. No.: 18/513,874

(22) Filed: Nov. 20, 2023

(65) Prior Publication Data

US 2024/0098316 A1   Mar. 21, 2024

Related U.S. Application Data

(63) Continuation of application No. PCT/CN2022/137870, filed on Dec. 9, 2022.

(30) Foreign Application Priority Data

Jan. 27, 2022   (CN) .......................... 202210103016.X

(51) Int. Cl.
*H04N 21/234*   (2011.01)
*G06T 5/00*   (2006.01)
(Continued)

(52) U.S. Cl.
CPC .......... *H04N 21/2343* (2013.01); *G06T 5/00* (2013.01); *H04N 21/23418* (2013.01); *G06T 2207/20076* (2013.01)

(58) Field of Classification Search
None
See application file for complete search history.

(56) References Cited

U.S. PATENT DOCUMENTS

| 2016/0217552 A1 | 7/2016 | Yang et al. |
| 2021/0084278 A1 | 3/2021 | Harviainen et al. |
| 2023/0196662 A1* | 6/2023 | Kaskela ............... G06N 3/0464 345/611 |

FOREIGN PATENT DOCUMENTS

| CN | 101950428 A | 1/2011 |
| CN | 102811353 A * | 12/2012 |

(Continued)

OTHER PUBLICATIONS

International Search Report for PCT/CN2022/137870 dated Feb. 10, 2023.

(Continued)

*Primary Examiner* — Samuel D Fereja
(74) *Attorney, Agent, or Firm* — Sughrue Mion, PLLC

(57) ABSTRACT

A video encoding method includes obtaining a current image frame, performing video image enhancement on a target region in the current image frame, to generate an image-enhanced image frame, the target region including a region in which hopping occurs in a pixel value of a pixel in the current image frame, and encoding the image-enhanced image frame.

20 Claims, 7 Drawing Sheets

Obtain a current image frame — S101

Perform video image enhancement on a target region in the current image frame, to obtain an image-enhanced image frame, the target region including a region in which hopping occurs in a pixel value of a pixel in the current image frame — S102

Encode the image-enhanced image frame — S103

(51) Int. Cl.
    *H04N 21/2343*    (2011.01)
    *H04N 21/241*     (2011.01)

(56) References Cited

FOREIGN PATENT DOCUMENTS

| | | | |
|---|---|---|---|
| CN | 104166967 A | | 11/2014 |
| CN | 113313702 A | | 8/2021 |
| CN | 113674165 A | * | 11/2021 |

OTHER PUBLICATIONS

Written Opinion for PCT/CN2022/137870 dated Feb. 10, 2023.
Extended European Search Report dated Jan. 29, 2025 in Application No. 22923504.9.

* cited by examiner

VIDEO ENCODING METHOD AND APPARATUS, REAL-TIME COMMUNICATION METHOD AND APPARATUS, DEVICE, AND STORAGE MEDIUM

RELATED APPLICATION

This application claims priority to International Patent Application No. PCT/CN2022/137870, filed on Dec. 9, 2022, which is based on and claims priority to Chinese Patent Application No. 202210103016X, filed with the China National Intellectual Property Administration on Jan. 27, 2022, the entireties of each of which being incorporated by reference herein.

FIELD

Embodiments of the disclosure relate to the field of Internet technologies, and in particular, to a video encoding method and apparatus, a real-time communication method and apparatus, a device, and a storage medium.

BACKGROUND

Cloud game is an online game technology based on a cloud computing technology. With the development of cloud rendering and video encoding technologies, cloud gaming has gradually become popular and become an important game form. In cloud gaming, game running logic, game rendering logic, and the like are placed in a cloud server. Encoding and compression are performed on a game picture by using video encoding technology, an encoded bitstream is transmitted to a terminal device through a network, and then the terminal device decodes and plays the bitstream.

In a current mainstream video encoding technology, for example, H.264 and a H.265, a part of high-frequency video information is inevitably lost. A lower code rate indicates that more high-frequency video information is lost. The loss of high-frequency video information is represented as a blurry image in a pixel domain, especially in a region with a rich video texture.

Poor image quality after a video is encoded is an urgent problem that needs to be resolved.

SUMMARY

According to an aspect of one or more embodiments, there is provided a video encoding method, performed by a server, the video encoding method comprising obtaining a current image frame; performing video image enhancement on a target region in the current image frame, to generate an image-enhanced image frame, the target region comprising a region in which hopping occurs in a pixel value of a pixel in the current image frame; and encoding the image-enhanced image frame.

According to other aspects of one or more embodiments, there is also provided a video encoding apparatus and a non-transitory computer readable medium consistent with the video encoding method.

DESCRIPTION OF EMBODIMENTS

Figure 1:
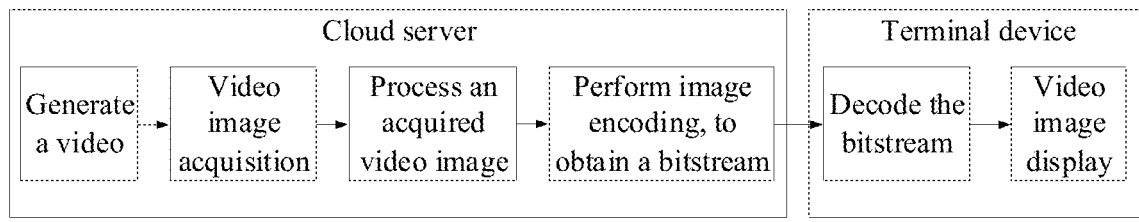
FIG. 1 is a schematic diagram of a video image processing process according to some embodiments.

Certain embodiments are described in detail below with reference to the drawings. The described embodiments are not to be construed as a limitation to the present disclosure.

In the following descriptions, some related embodiments describe a subset of all possible embodiments. However, it may be understood that the some embodiments may be the same subset or different subsets of all the possible embodiments, and may be combined with each other without conflict.

"Plurality of", as mentioned in the specification means two or more. "And/or" describes an association relationship for describing associated objects and represents that three relationships may exist. For example, A/B may represent the following cases: Only A exists, both A and B exist, and only B exists. Similarly, the phrase "at least one of A and B" includes within its scope "only A", "only B" and "A and B". The character "I" in this specification generally indicates an "or" relationship between the associated objects unless otherwise noted or the context suggests otherwise.

In the specification, claims, and the foregoing accompanying drawings, the terms "first", "second", and so on are intended to distinguish between similar objects rather than indicating a specific order. It is to be understood that data used in this way is exchangeable in a proper case, so that the embodimentsdescribed herein can be implemented in an order different from the order shown or described herein. Moreover, the terms "include", "contain" and any other variants cover a non-exclusive inclusion. For example, a process, method, system, product, or device that includes a list of steps or units is not necessarily limited to those steps or units, but may include other steps or units not expressly listed or inherent to such a process, method, product, or server.

According to some embodiments, a video encoding method is provided, which may be performed by a server, the method including:

obtaining a current image frame;
generating an image-enhanced image frame by performing image enhancement on a target region in the current image frame, the target region including a region in which hopping occurs in a pixel value of a pixel in the current image frame; and encoding the image-enhanced image frame.

According to some embodiments, a real-time communication method is provided, which may be performed by a server, and the method including:

performing video image acquisition on a video generated in real time, to obtain a video stream;
performing video image enhancement on a target region in each image frame in the video stream according to a rendering capability of a terminal device, to obtain an image-enhanced video stream, the target region including a region in which hopping occurs in a pixel value of a pixel in each image frame;
encoding the image-enhanced video stream, to obtain an encoded bitstream; and
transmitting the encoded bitstream to the terminal device, so that the terminal device performs video image display according to the encoded bitstream.

According to some embodiments, a video encoding apparatus is provided, including:

an obtaining module, configured to obtain a current image frame;
an image enhancement module, configured to generate an image-enhanced image frame by performing image enhancement on a target region in the current image frame, the target region including a region in which hopping occurs in a pixel value of a pixel in the current image frame; and
an encoding module, configured to encode the image-enhanced image frame.

According to some embodiments, a real-time communication apparatus is provided, including:

an acquisition module, configured to perform video image acquisition on a video generated in real time, to obtain a video stream;
an image enhancement module, configured to perform video image enhancement on a target region in each image frame in the video stream according to a rendering capability of a terminal device, to obtain an image-enhanced video stream, the target region including a region in which hopping occurs in a pixel value of a pixel in each image frame;
an encoding module, configured to encode the image-enhanced video stream, to obtain an encoded bitstream; and
a transmitting module, configured to transmit the encoded bitstream to the terminal device, so that the terminal device performs video image display according to the encoded bitstream.

According to some embodiments, an electronic device is provided, including: one or more processors and a memory, the memory being configured to store computer-readable instructions, the one or more processors being configured to invoke and run the computer-readable instructions stored in the memory, to perform the method according to the first aspect or various implementations of the first aspect or the second aspect or various implementations of the second aspect.

According to some embodiments, a computer-readable storage medium is provided. The computer-readable storage medium is configured to store computer-readable instructions, and the computer-readable instructions cause a computer to perform the method according to the first aspect or various implementations of the first aspect or the second aspect or various implementations of the second aspect.

According to some embodiments, a computer program product is provided, including computer-readable instructions, the computer-readable instructions causing a computer to perform the method according to the first aspect or various implementations of the first aspect or the second aspect or various implementations of the second aspect.

Before the technical solutions in this application are described, related knowledge of this application is described below first.

1. Cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

2. Cloud gaming, which may also be referred to as gaming on demand, is an online gaming technology based on a cloud computing technology. The cloud gaming technology enables a thin client with relatively limited graphics processing and data computing capabilities to run a high-quality game. In a cloud gaming scenario, a game runs on a cloud server rather than a player game terminal. The cloud server renders a game scene into a video and audio stream and transmits the video and audio stream to the player game terminal through a network. Without strong graphics computing and data processing capabilities, the player game terminal only needs to have a basic streaming media playing capability and a capability of obtaining an instruction inputted by a player and sending the instruction to the cloud server.

3. Graphics processing unit (GPU) is a processing unit specifically designed for graphics computing. A difference from a conventional CPU is that there are a plurality of computing cores, but a computing capability of each core is not good as that of a CPU core and is suitable for executing a high-concurrency task.

As described above, in an existing video encoding method, a part of high-frequency video information is inevitably lost, resulting in a blurred and low-definition video image after a video is encoded. To resolve this technical problem, in this application, before a current image frame is encoded, image enhancement is performed on a region in which hopping occurs in a pixel value of a pixel in the current image frame, to obtain an image-enhanced image frame, and then the image-enhanced image frame is encoded. The region in which hopping occurs in the pixel value of the pixel in the current image frame is a distinguishable texture in a video image and is also a texture recognizable by human eyes. Image enhancement on the distinguishable texture in the video image can compensate a blurring effect after a video is encoded, to improve definition of the video image after the video is encoded. In addition, in this application, image enhancement is performed on the texture recognizable by human eyes rather than all regions in the current image frame, with a relatively low encoding delay.

It is to be understood that the technical solution of this application is applicable to the following scenarios, but are not limited thereto.

Figure 2:
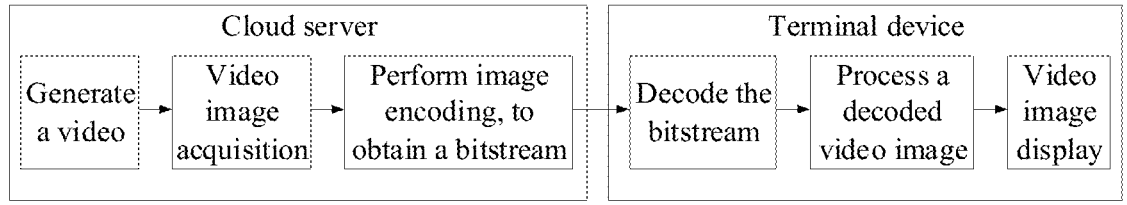
FIG. 2 is a schematic diagram of a video image processing process according to some embodiments.

Currently, some video or image processing processes based on a cloud scenario may be as follows. FIG. 1 is a schematic diagram of a video image processing process according to some embodiments. FIG. 2 is a schematic diagram of a video image processing process according to some embodiments. As shown in FIG. 1, a cloud server generates a video, performs video image acquisition, processes an acquired video image, and encodes a processed video image, to obtain a bitstream of the video image. Further, the cloud server may send the bitstream to a terminal device. The terminal device decodes the bitstream, and finally displays the video image according to a decoding result. In some embodiments, as shown in FIG. 2, a cloud server generates a video, performs video image acquisition, and encodes an acquired video image, to obtain a bitstream of the video image. Further, the cloud server may send the bitstream to a terminal device. The terminal device decodes the bitstream, performs processing such as sharpening processing, blur processing, and noise reduction processing on the decoded video image, and finally displays a processed video image.

Figure 3:
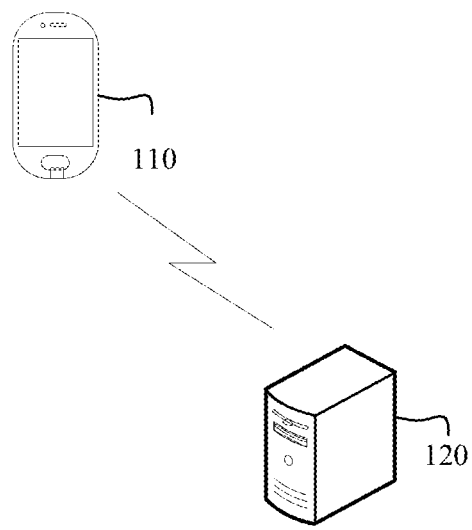
FIG. 3 is a schematic diagram of an application scenario of a video encoding method according to some embodiments.

For example, FIG. 3 is a schematic diagram of an application scenario of a video encoding method according to some embodiments. As shown in FIG. 3, a terminal device 110 may communicate with a server 120. The terminal device 110 has a streaming media playing function. The server 120 has a graphics processing function, for example, an image segmentation function, an image fusion function, or an image enhancement function, and the server 120 further has a video and audio stream data transmission function, for example, a video encoding function.

In some possible implementations, the application scenario shown in FIG. 3 may further include: a base station, a core network side device, and the like. In addition, FIG. 3 shows an example of one terminal device and one server. Another quantity of terminal devices and another quantity of servers may be actually included. This is not limited in this application.

In some possible implementations, the server 120 in FIG. 3 may be an independent physical server, or may be a server cluster including a plurality of physical servers or a distributed system, or may be a cloud server providing a cloud computing service. This is not limited in this application.

In a cloud gaming scenario, the cloud server refers to a server running a game on a cloud end and has a video enhancement (processing before encoding) function, a video encoding function, and the like, but are not limited thereto. The terminal device refers to a device that has rich human-computer interaction methods, has the ability to access the Internet, is usually equipped with various operating systems, and has strong processing capabilities. The terminal device may be a smartphone, a television in a living room, a tablet computer, an in-vehicle terminal, a player game terminal such as a handheld game console, or the like, but is not limited thereto.

In the cloud gaming scenario, the cloud server needs to transmit huge amounts of game screen content in real time. Therefore, it is advantageous to ensure both a low delay transmission requirement and definition of a video picture. According to the video encoding method provided in this application, before a current image frame is encoded, image enhancement is performed on a region in which hopping occurs in a pixel value of a pixel in the current image frame, to obtain an image-enhanced image frame, and then the image-enhanced image frame is encoded, to obtain a bitstream for transmission, thereby improving definition of a video image after a video is encoded. In addition, image enhancement is performed on a texture recognizable by human eyes rather than all regions in the current image frame, with a relatively low encoding delay. Therefore, the method is applicable to the cloud gaming scenario.

The technical solution of this application is described below in detail.

Figure 4:
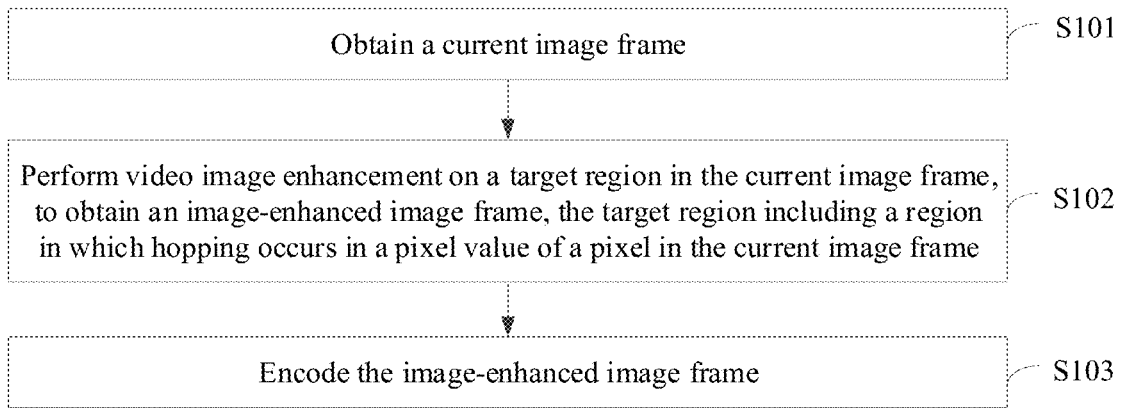
FIG. 4 is a flowchart of a video encoding method according to some embodiments.

FIG. 4 is a flowchart of a video encoding method according to some embodiments. The video encoding method may be performed by a video encoding apparatus, and the video encoding apparatus may be implemented in a manner of software and/or hardware. The method may be, for example, performed by the server 120 shown in FIG. 3, but is not limited thereto. As shown in FIG. 4, the method includes the following operations.

S101. Obtain a current image frame.

Specifically, the current image frame is an image frame in a frame sequence and is a to-be-encoded image frame. In some embodiments, when the technical solution of this application is applicable to a cloud gaming scenario, the current image frame may be a real-time acquired or generated image frame.

S102. Perform image enhancement on a target region in the current image frame, to obtain an image-enhanced image frame, the target region including a region in which hopping occurs in a pixel value of a pixel in the current image frame.

Specifically, the target region in the current image frame may include the region in which hopping occurs in the pixel value of the pixel in the current image frame. Generally, a texture of a video mainly refers to a boundary region in an image frame, hopping occurs in a pixel value of a pixel in the boundary region, and the boundary region is a region recognizable by human eyes. In some embodiments, image enhancement is performed on a texture recognizable by human eyes rather than all regions in the current image frame. Therefore, a relatively low encoding delay is achieved.

In a possible implementation, the performing image enhancement on a target region in the current image frame, to obtain an image-enhanced image frame may specifically include S1021 to S1023.

S1021. Determine M texture boundary points included in the target region in the current image frame, M being a positive integer.

In some embodiments, each texture boundary point of the M texture boundary points is determined in the following manner:

in a case that a gradient strength of a current pixel in the current image frame is greater than or equal to a preset threshold, determining the current pixel as the texture boundary point.

For example, a current pixel is I (x, y), and a pixel on the left side of the current pixel, a pixel on the lower side of the current pixel, and a pixel on the lower left side of the current pixel are respectively I (x+1, y), I (x, y+1), and I (x+1, y+1). A gradient strength of the current pixel I (x, y) is ((I (x, y)—I (x+1, y+1))²+((I (x+1, y)—I (x+1, y+1))². If the gradient strength of the current pixel I (x, y) is greater than a preset threshold, the current pixel is determined as a texture boundary point.

In some embodiments, the manner of determining the texture boundary point may be further a manner in which a sobel operator, a canny detection algorithm, or the like is used. However, embodiments are not limited thereto.

In some embodiments, the gradient strength of the current pixel is calculated, and whether the current pixel is the texture boundary point is determined based on a result of comparison between the preset threshold and the gradient strength of the current pixel. Through analysis of the pixel value, whether hopping occurs in the pixel value of the pixel can be accurately determined, so that accuracy of determining the texture boundary point can be improved.

S1022. Perform pixel enhancement on each texture boundary point of the M texture boundary points, to obtain M pixel-enhanced texture boundary points.

A process of performing pixel enhancement on each pixel may be performed in parallel and has relatively high parallelism degree. Pixel enhancement processing may be performed on each texture boundary point independently, each texture boundary point does not have a sequence dependency relationship, and parallel processing may be performed by using a multi-core CPU or a GPU, to achieve an objective of parallel acceleration.

Specifically, in a possible implementation, the performing pixel enhancement on each texture boundary point of the M texture boundary points, to obtain M pixel-enhanced texture boundary points may specifically include:

performing pixel enhancement on each texture boundary point of the M texture boundary points in the following manners, to obtain the M pixel-enhanced texture boundary points:

determining an average pixel value of the texture boundary point, the average pixel value being an average pixel value of N pixels around the texture boundary point, and N being a preset positive integer; and performing pixel enhancement on the texture boundary point according to a pixel value of the texture boundary point and the average pixel value of the texture boundary point, to obtain a pixel-enhanced texture boundary point. Pixel enhancement is performed on the texture boundary point with reference to the average pixel value of the pixels around the texture boundary point, so that an association between the pixels around the texture boundary point and the texture boundary point can be fully considered, and an enhancement effect of the texture boundary point can be further improved.

The average pixel value may be the average pixel value of the N pixels around the texture boundary point. Determining of the N pixels may be related to a distance to the texture boundary point, and a closer distance indicates denser distribution, so that the calculated average pixel value can meet a rule in which a closer distance to the texture boundary point indicates larger impact on the enhancement effect of the texture boundary point and a longer distance to the texture boundary point indicates smaller impact on the enhancement effect of the texture boundary point. Effectiveness of the enhancement effect of the texture boundary point is ensured when a calculation amount of the average pixel value is reduced.

In some embodiments, to reduce calculation complexity, the average pixel value may be further a weighted average value of N pixel sampling points in a preset figure formed by the texture boundary point and pixels around the texture boundary point, and the texture boundary point is located at a central position of the preset figure. The central position may be a pixel located in a middle row and a middle column of the preset figure. When both a quantity of rows and a quantity of columns formed by the pixels of the preset figure are odd numbers, the central position of the preset figure is unique. When one of the quantity of rows and the quantity of columns formed by the pixels of the preset figure is an even number, there are two central positions of the preset figure. In this case, the texture boundary point may be located at one of the two central positions. When both the quantity of rows and the quantity of columns formed by the pixels of the preset figure are even numbers, there are four central positions of the preset figure. In this case, the texture boundary point may be located at any one of the four central positions.

The preset figure may be a regular figure or may be an irregular figure. For example, the preset figure may be a square, a rectangle, or a diamond. In the N pixel sampling points, a weight of each pixel sampling point may be preset, for example, may be set according to a distance between the pixel sampling point and the texture boundary point. A smaller distance indicates a larger weight and larger impact on the enhancement effect of the texture boundary point.

In some embodiments, the pixel sampling points in the preset figure may be distributed evenly or may be distributed unevenly. For example, a distribution sparsity degree of the pixel sampling point in the preset figure may be in positive correlation with a distance between the pixel sampling point and the texture boundary point. A closer distance to the texture boundary point indicates denser sampling, and a longer distance to the texture boundary point indicates sparser sampling, to avoid introducing a relatively large quantity of pixel sampling points far away from the texture boundary point, which increase a calculation amount and cause the enhancement effect of the texture boundary point to be insignificant. Therefore, effective sampling of the pixel is implemented.

In a possible implementation, the preset figure is a K*K square, K≥5, and K is a positive odd number. The N pixel sampling points include: pixels located in odd-numbered rows and odd-numbered columns in the K*K square and pixels adjacent to the texture boundary point. The calculation complexity is reduced, and a result without sampling is closer.

In some embodiments, in a possible implementation, the performing pixel enhancement on the texture boundary point according to a pixel value of the texture boundary point and the average pixel value of the texture boundary point, to obtain a pixel-enhanced texture boundary point may specifically include:

determining an enhanced pixel value according to the pixel value of the texture boundary point and the average pixel value of the texture boundary point, the enhanced pixel value being equal to a sum of the pixel value of the texture boundary point and a target value, and the target value being a product of a preset enhancement parameter and a difference between the pixel value of the texture boundary point and the average pixel value of the texture boundary point. In some embodiments, the calculation process may be represented by using a formula: $s=m+T*(m-n)$, where s is the enhanced pixel value, m is the pixel value of the texture boundary point, n is the average pixel value of the texture boundary point, and T is the preset enhancement parameter. In some embodiments, T may be a value between 0 and 1.

adjusting the pixel value of the texture boundary point as the enhanced pixel value, to obtain the pixel-enhanced texture boundary point.

In some embodiments, a process of performing pixel enhancement on each pixel may be performed in parallel and has relatively high parallelism degree. Pixel enhancement processing may be performed on each texture boundary point independently, each texture boundary point does not have a sequence dependency relationship, and parallel processing may be performed by using a multi-core CPU or a GPU, to achieve an objective of parallel acceleration.

In some embodiments, blur degrees of a picture after a video is encoded are different under different bit rates, and the preset threshold of the gradient strength and the enhancement parameter may be set according to the bit rate.

S1023. Obtain the image-enhanced image frame according to the M pixel-enhanced texture boundary points and a pixel outside the target region in the current image frame.

In some embodiments, compared with the original image frame, in the image-enhanced image frame, pixel enhancement is separately performed on only the M texture boundary points in the target region, to improve definition of a video image after a video is encoded. In addition, because image enhancement is not performed on all regions in the current image frame, a quantity of pixels that need to be enhanced can be effectively reduced, and a relatively low encoding delay is achieved.

S103. Encode the image-enhanced image frame.

An arrangement sequence of the image-enhanced image frame is the same as an arrangement sequence of the image-enhanced image frame in an original video. Image enhancement processing on the image frame and encoding the image-enhanced image frame do not affect a sequence of each image frame, and image enhancement processing on the image frame can improve an effect of definition of a video image after a video is encoded.

According to the video encoding method provided in this application, before a current image frame is encoded, image enhancement is performed on a region in which hopping occurs in a pixel value of a pixel in the current image frame, to obtain an image-enhanced image frame, and then the image-enhanced image frame is encoded. The region in which hopping occurs in the pixel value of the pixel in the current image frame is a distinguishable texture in a video image and is also a texture recognizable by human eyes. Image enhancement on the distinguishable texture in the video image can compensate a blurring effect after a video is encoded, to improve definition of a video image after the video is encoded. In addition, in this application, image enhancement is performed on the texture recognizable by human eyes rather than all regions in the current image frame, with a relatively low encoding delay.

The following describes the technical solution of the video encoding method provided in this application in detail with reference to a specific embodiment.

Figure 5:
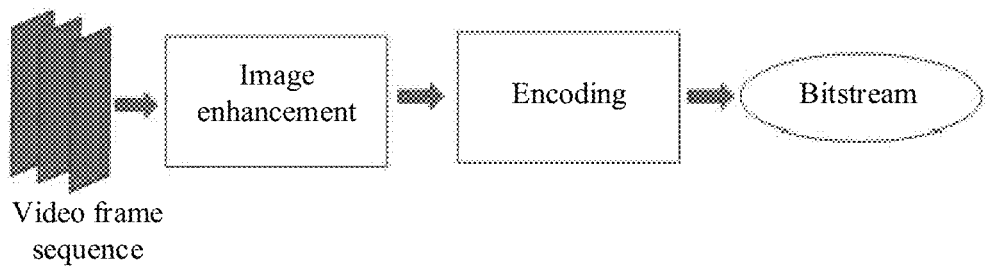
FIG. 5 is a flowchart block diagram of a video encoding method according to some embodiments.

A degree of definition of a video texture affects subjective experience of a user, and a technology of maintaining a perceivable texture in a picture is also relatively important. To improve definition of a video image after a video is encoded, some embodiments provide a video encoding method. FIG. 5 is a flowchart block diagram of a video encoding method according to some embodiments. In some embodiments, for each image frame in an image frame sequence, image enhancement may first be performed on the image frame, and then video encoding may be performed on an image-enhanced image frame, to obtain a bitstream output. Through image enhancement, an original texture contrast of the image frame can be maintained and a blurring effect caused by encoding can be offset. An image enhancement process is described below in detail with reference to FIG. 6.

Figure 6:
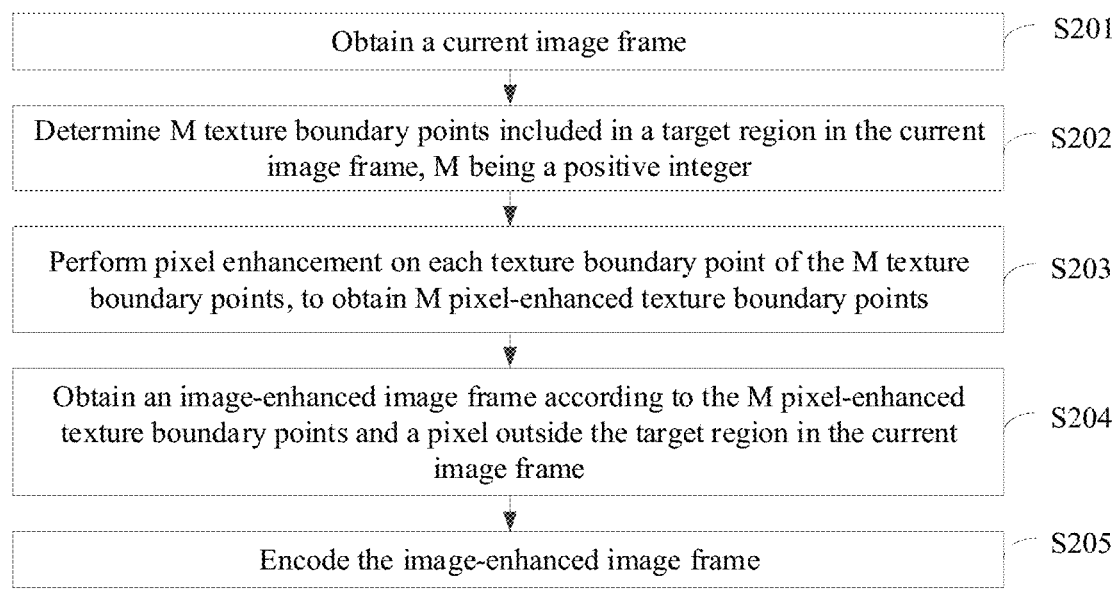
FIG. 6 is a schematic flowchart of a video encoding method according to some embodiments.

FIG. 6 is a schematic flowchart of a video encoding method some embodiments. The video encoding method may be performed by a video encoding apparatus, and the video encoding apparatus may be implemented in a manner of software and/or hardware. The method may be, for example, performed by the server 120 shown in FIG. 1, but is not limited thereto. As shown in FIG. 6, the method may include the following operations.

S201. Obtain a current image frame.

S202. Determine M texture boundary points included in a target region in the current image frame, M being a positive integer.

In some embodiments, each texture boundary point of the M texture boundary points is determined in the following manner:

in a case that a gradient strength of a current pixel in the current image frame is greater than or equal to a preset threshold, determining the current pixel as the texture boundary point.

For example, a current pixel is I (x, y), and a pixel on the left side of the current pixel, a pixel on the lower side of the current pixel, and a pixel on the lower left side of the current pixel are respectively I (x+1, y), I (x, y+1), and I (x+1, y+1). A gradient strength of the current pixel I (x, y) is $((I(x, y) - I(x+1, y+1))^2 + ((I(x+1, y) - I(x+1, y+1))^2$. If the gradient strength of the current pixel I (x, y) is greater than a preset threshold, the current pixel is determined as a texture boundary point.

S203. Perform pixel enhancement on each texture boundary point of the M texture boundary points, to obtain M pixel-enhanced texture boundary points.

In some embodiments, the performing pixel enhancement on each texture boundary point of the M texture boundary points, to obtain M pixel-enhanced texture boundary points may specifically include:

performing pixel enhancement on each texture boundary point of the M texture boundary points in the following manners, to obtain the M pixel-enhanced texture boundary points:

first determining an average pixel value of the texture boundary point, the average pixel value being a weighted average value of N pixel sampling points in a preset figure formed by pixels around the texture boundary point by using the texture boundary point as a center.

The pixel sampling point is used for reducing calculation complexity. In some embodiments, a distribution sparsity degree of each pixel sampling point in the preset figure is in positive correlation with a distance between the pixel sampling point and the texture boundary point. In some embodiments, the preset figure is a K*K square, K≥5, and K is a positive odd number. The N pixel sampling points include: pixels located in odd-numbered rows and odd-numbered columns in the K*K square and pixels adjacent to the texture boundary point. In this manner, the pixel sampling points are evenly distributed in the K*K square. The calculation complexity is reduced, and a result without sampling is closer.

Figure 7:
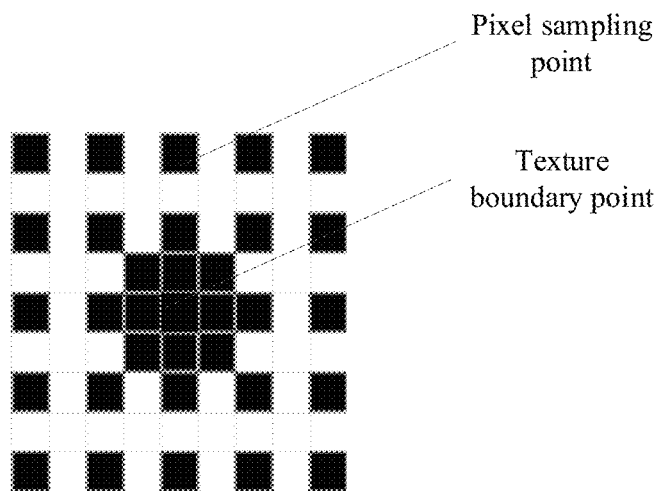
FIG. 7 is a schematic diagram of a pixel sampling point in a 9*9 square of a preset figure according to some embodiments.

For example, in some embodiments, an example in which the preset figure is a 9*9 square is used. FIG. 7 is a schematic diagram of a pixel sampling point in a 9*9 square of a preset figure according to some embodiments. As shown in FIG. 7, all pixels at black positions are pixel sampling points. In some embodiments, for example, a weight of each pixel sampling point is equal and is 1. Pixels at white positions are unsampled pixels. N=32, and an average pixel value of a texture boundary point shown in FIG. 7 is an average pixel value of 32 pixel sampling points shown at the black positions, that is, an average value of 32 pixel values.

then determining an enhanced pixel value according to a pixel value of the texture boundary point and the average pixel value of the texture boundary point, the enhanced pixel value being equal to a sum of the pixel value of the texture boundary point and a target value, and the target value being a product of a preset enhancement parameter and a difference between the pixel value of the texture boundary point and the average pixel value of the texture boundary point; and adjusting the pixel value of the texture boundary point as the enhanced pixel value, to obtain the pixel-enhanced texture boundary point.

In some embodiments, the calculation process may be represented by using a formula: $s=m+T*(m-n)$, where s is the enhanced pixel value, m is the pixel value of the texture boundary point, n is the average pixel value of the texture boundary point, and T is the preset enhancement parameter. In some embodiments, T may be a value between 0 and 1.

In some embodiments, when a preset threshold Q of a gradient strength and the enhancement parameter T are set, a general assessment indicator may be used, that is, a large quantity of game sequences and a parameter combination (that is, a combination of the preset threshold Q of the gradient strength and the enhancement parameter T) are test through video multimethod assessment fusion (VMAF), and optimal parameters are slightly different when a test result is display in a low bit rate and a high bit rate. In the low bit rate (the bit rate is less than 8000 kbps), when Q and T are respectively 50 and 0.5, both the VMAF and a subjective effect of a user can reach a relatively good state. In the high bit rate (the bit rate is greater than or equal to 8000 kbps), a blurring effect caused by video encoding and compression is relatively small, and a better effect is achieved when Q and T are respectively 50 and 0.3.

S204. Obtain an image-enhanced image frame according to the M pixel-enhanced texture boundary points and a pixel outside the target region in the current image frame.

Specifically, the process is to adjust a pixel value of each texture boundary point of the M texture boundary points in the current image frame, without changing a pixel value of another pixel. The image-enhanced image frame may be obtained according to the M pixel-enhanced texture boundary points and the pixel outside the target region in the current image frame.

S205. Encode the image-enhanced image frame.

Figure 8:
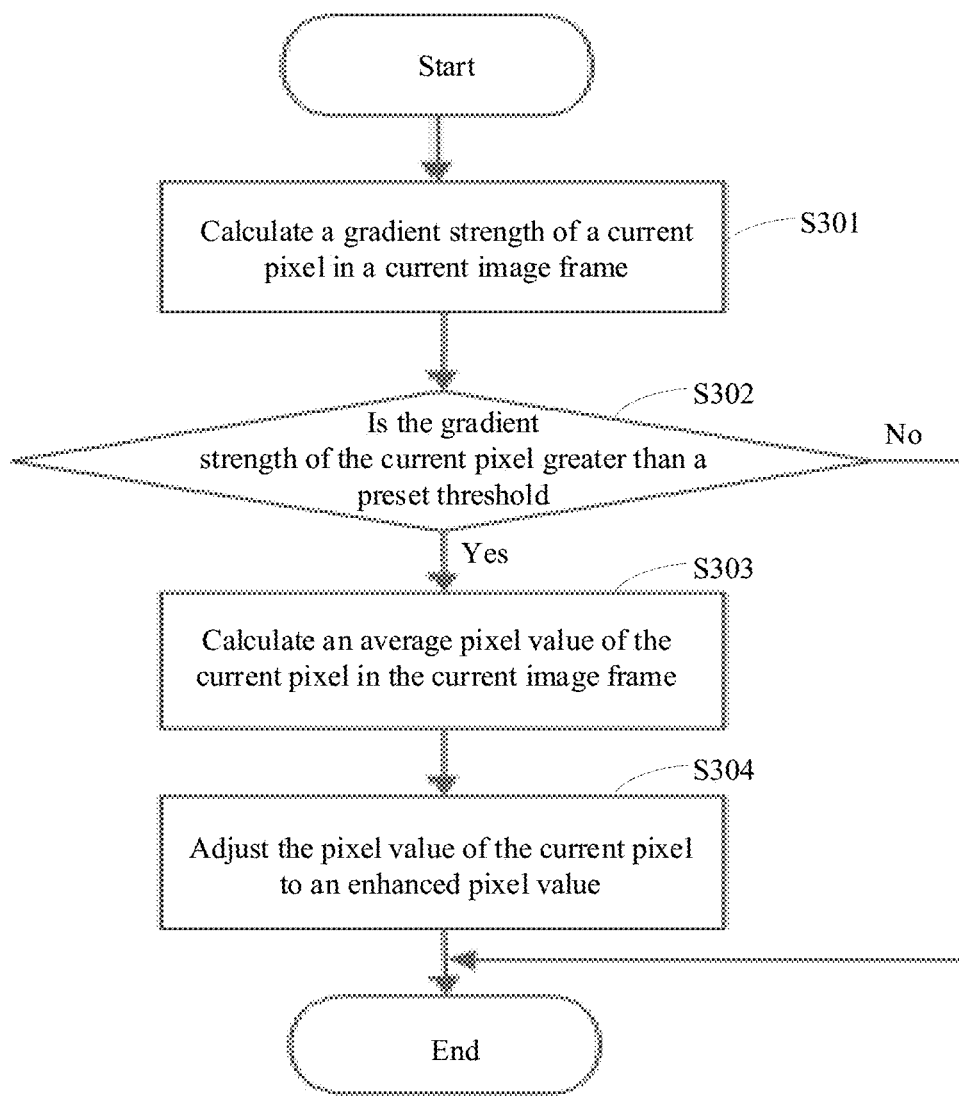
FIG. 8 is a process of processing a pixel in a current image frame in a video encoding method according to some embodiments.

In some embodiments, a process of performing pixel enhancement on each pixel may be performed in parallel and has relatively high parallelism degree. Pixel enhancement processing may be performed on each texture boundary point independently, each texture boundary point does not have a sequence dependency relationship, and parallel processing may be performed by using a multi-core CPU or a GPU, to achieve an objective of parallel acceleration. A process of processing each pixel in the current image frame is described below in detail with reference to FIG. 8. FIG. 8 is a process of processing a pixel in a current image frame in a video encoding method according to some embodiments. As shown in FIG. 8, the method may include the following operations.

S301. Calculate a gradient strength of a current pixel in a current image frame.

S302. Determine whether the gradient strength of the current pixel is greater than a preset threshold.

If the gradient strength of the current pixel is greater than the preset threshold, the current pixel is a texture boundary point, and S303 is performed. If the gradient strength of the current pixel is not greater than the preset threshold, the process ends.

S303. Calculate an average pixel value of the current pixel in the current image frame.

The average pixel value of the current pixel may be calculated according to the pixel sampling points shown in FIG. 7, that is, the average pixel value of the 32 pixel sampling points shown at the black positions in FIG. 7, that is, the average value of the 32 pixel values, is calculated.

S304. Calculate an enhanced pixel value of the current pixel according to a pixel value of the current pixel and the average pixel value of the current pixel, and adjust the pixel value of the current pixel as the enhanced pixel value.

The calculation process may be represented by using a formula: $s=m+T*(m-n)$, where s is the enhanced pixel value, m is the pixel value of the texture boundary point, n is the average pixel value of the texture boundary point, and T is the preset enhancement parameter. In some embodiments, T may be a value between 0 and 1. In some embodiments, if m is relatively close to n, in a preset range, it may be considered that a contrast of the current pixel is relatively low, otherwise, it may be considered that the contrast of the current pixel is relatively high. In some embodiments, an original texture contrast in the image frame is maintained through pixel value adjustment.

Figure 9:
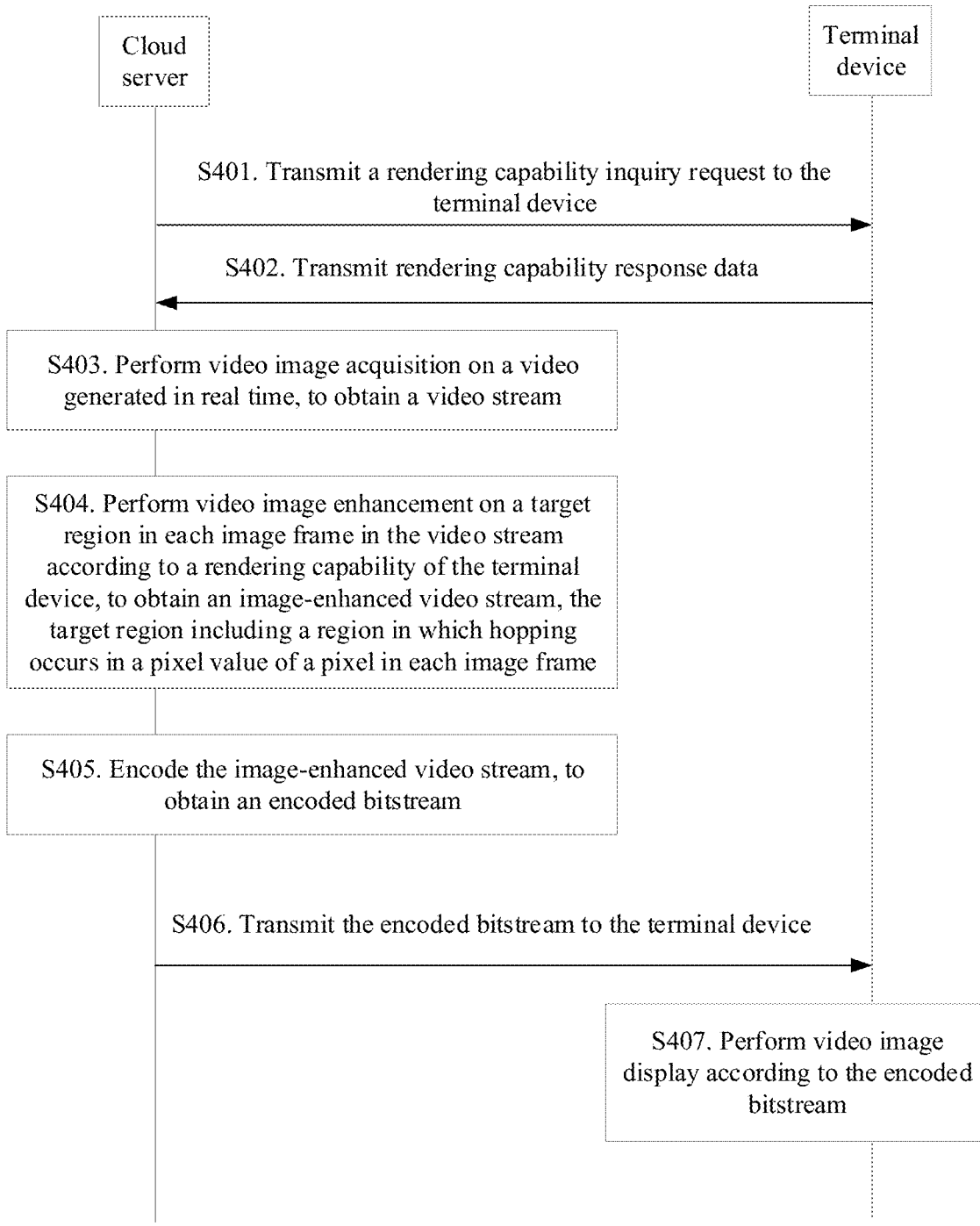
FIG. 9 is a flowchart of a real-time communication method according to some embodiments.

FIG. 9 is a flowchart of a real-time communication method according to some embodiments. As shown in FIG. 9, a server in some embodiments is a cloud server, and the method in some embodiments may include the following operations.

S401. The cloud server transmits a rendering capability inquiry request to a terminal device.

S402. The cloud server receives rendering capability response data fed back by the terminal device, the rendering capability response data including a rendering capability of the terminal device.

Figure 10:
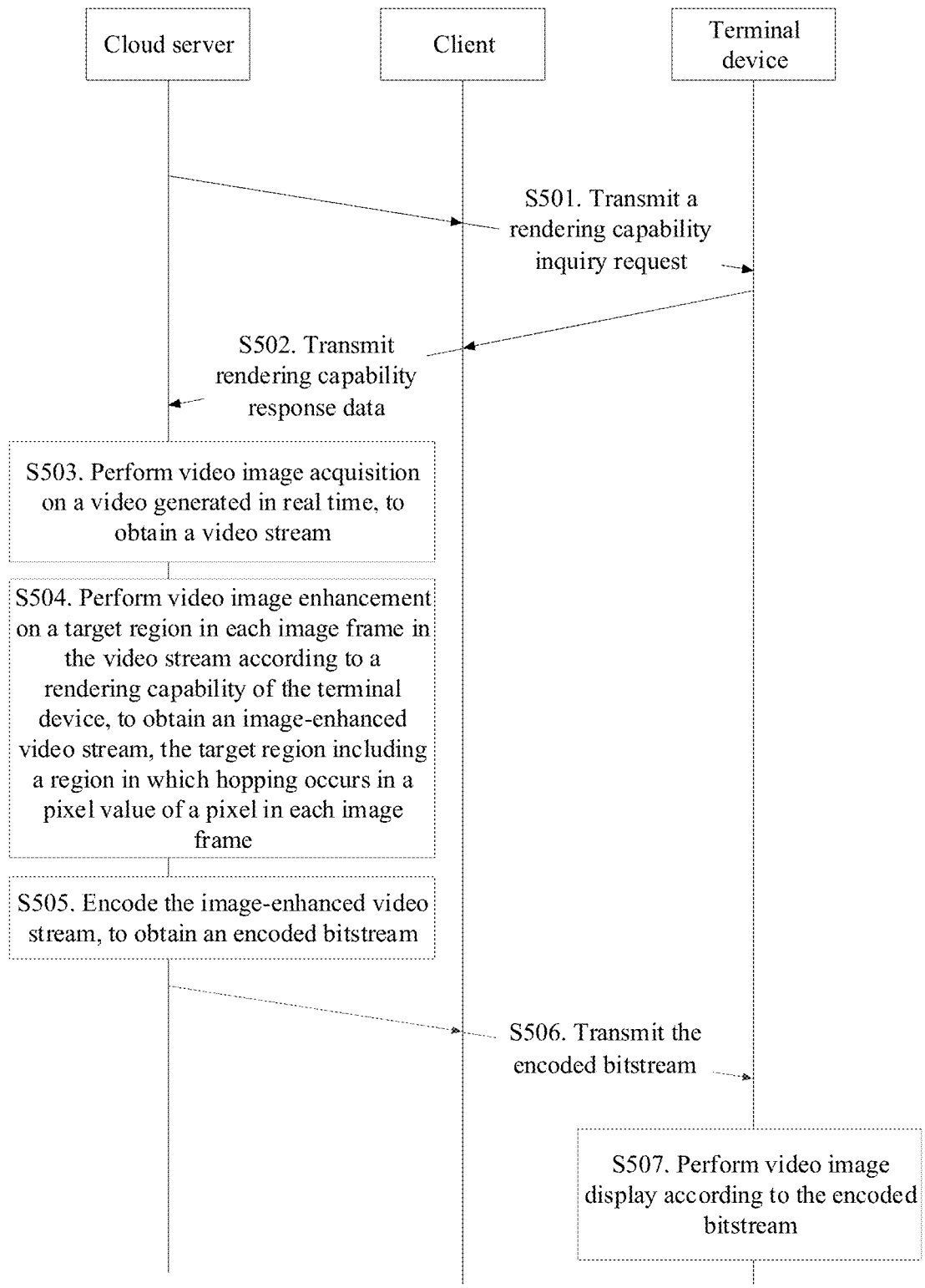
FIG. 10 is a flowchart of a real-time communication method according to some embodiments.

In some embodiments, FIG. 10 is a flowchart of a real-time communication method according to some embodiments. As shown in FIG. 10, in S501, the cloud server may transmit a rendering capability inquiry request to the terminal device by using a client installed on the terminal device, to determine a rendering capability of the terminal device. In S502, the terminal device may also return rendering capability response data to the cloud server by using the client. In the cloud gaming scenario, the client may be a cloud gaming client. Operation S503 to operation S505 and operation S507 are the same as operation S403 to operation S405 and operation S407. In S506, the cloud server may send an encoded bitstream to the terminal device by using the client installed on the terminal device.

In some embodiments, the rendering capability inquiry request is used for requesting to obtain the rendering capability of the terminal device.

In some embodiments, the rendering capability inquiry request includes at least one of the following: a protocol version number, a video resolution, an image frame rate, and a queried rendering algorithm type, but are not limited thereto.

In some embodiments, the protocol version number refers to a lowest protocol version supported by the cloud server, and the protocol may be a rendering protocol.

In some embodiments, the video resolution may be resolution, for example, 1080p and 720p, of a to-be-rendered video source.

In some embodiments, the image frame rate may be resolution, for example, 60 fps and 30 fps, of a to-be-rendered video source.

In some embodiments, the queried rendering algorithm type may be at least one of the following: a sharpening processing algorithm, a noise reduction processing algorithm, a blur processing algorithm, a video high dynamic range imaging (HDR) enhancement capability algorithm, and the like, but are not limited thereto.

In some embodiments, different rendering algorithms may be defined through enumeration, as shown in Table 1.

TABLE 1

| Rendering algorithm | |
| --- | --- |
| Rendering algorithm type | Enumeration definition |
| Undefined | 0 |
| Sharpening processing algorithm | 1 |
| HDR enhancement capability algorithm | 2 |

In some embodiments, the rendering capability inquiry request may be a rendering capability inquiry request for the current image frame.

A data structure of the rendering capability of the terminal device may be shown in Table 2.

TABLE 2

| Data structure of a rendering capability | | |
| --- | --- | --- |
| Section | Type | Section description |
| [render_ability] | — | Rendering capability |
| [analysis_ability] | — | Video analysis capability |
| [render_task] | — | Video rendering task |
| [analysis_task] | — | Video analysis task |
| [renderN] | — | Video rendering algorithm, where N is a value 1, 2, 3, ... |
| [analysisN] | — | Video analysis algorithm, where N is a value 1, 2, 3, ... |
| [renderN_args] | — | Video rendering algorithm parameter, where N is a value 1, 2, 3, ... |
| [analysisN_args] | — | Video analysis algorithm parameter, where N is a value 1, 2, 3, ... |
| Key | Type | Value description |
| resolution | Enumeration | Video size (for details of enumeration definition, reference is made to Table 4) |
| framerate | Enumeration | Image frame rate (for details of enumeration definition, reference is made to Table 5) |
| name | Character string | Algorithm name |
| type | Enumeration | Rendering/analysis algorithm type (for details of enumeration definition, reference is made to Table 7) 0: undefined; 1: video sharpening algorithm; 2: HDR algorithm; 3: video image mode; 1001: video image complexity analysis; and 1002: video image foreground analysis; |
| renders | Integer | Quantity of video rendering algorithms When a quantity of cascaded rendering algorithms is N, N sections follow, which are respectively [render1], [render2], ... , and [renderN], and are used for identifying specific information of N video rendering algorithms. |
| analyses | Integer | Quantity of video image analysis algorithms When a quantity of video image analysis algorithms is N, N sections follow, which are respectively [analysis1], [analysis2], ... , and [analysisN], and are used for identifying N specific video image analysis algorithms. |
| performances | Integer | Quantity of rendering/analysis performance indicators of a terminal device When a quantity of performance indicators of a decoder is N, N keys follow, which are respectively performance1, performance2, ... , and performanceN, and are used for identifying specific content of N performances. |
| performanceN | Character string (triplet) | N is a value 1, 2, 3, ... It indicates a performance data triplet supported by a smart terminal, a first element is a video size (for details, reference is made to Table 4), a second element is an image frame rate (for details, reference is made to Table 5), and a third element is a single-frame rendering delay, and has a unit of millisecond. For example, the terminal device performs rendering to reach 1080 p@60 fps by 5 ms, and it indicates that performanceN = 8, 8, 5 |
| scale | Integer | Identify a zoom scale of coordinates of a rectangular region. Without this field, it is identified as a full-image region. |

TABLE 2-continued

Data structure of a rendering capability

| | | |
|---|---|---|
| regions | Integer | Integer. Quantity of rectangular regions. When the quantity of rendered rectangular regions is N, N keys follow, which are respectively region1, region2, . . . , and regionN, and used for identifying that there are specifically N regions. Without this field, it is identified as a full-image region. |
| regionN | Integer | N is a value 1, 2, 3, . . . Represent a rectangular region, there are respectively left coordinates, upper coordinates, right coordinates, lower coordinates of the rectangular region, and the value is reduced according to a scale value. Example: for a video image size width * height, coordinates of the rectangular region indicated by rectangular region = 1, t, r, b are:<br>Left = floor (width * 1/scale)<br>Upper = floor (height * t/scale)<br>Right = ceil (width * r/scale) − 1<br>Lower = ceil (height * b/scale) − 1 |
| arg1 . . . argN | Specified by an algorithm | Video enhancement/analysis algorithm parameter is specified by a specific algorithm. |

In some embodiments, the rendering capability response data may include at least one of the following: an identifier used for identifying whether a rendering algorithm type to be queried by the cloud server is successfully queried, a protocol version number supported by the terminal device, capability information of the terminal device, and the like, but are not limited thereto.

In some embodiments, if the rendering algorithm type to be queried by the cloud server is successfully queried, the identifier used for identifying whether the rendering algorithm type to be queried by the cloud server is successfully queried may be indicated by using 0, and if the rendering algorithm type to be queried by the cloud server fails to be queried, the identifier used for identifying whether the rendering algorithm type to be queried by the cloud server is successfully queried may be indicated by using an error code, for example, 001.

In some embodiments, the protocol version number refers to a lowest protocol version supported by the terminal device, and the protocol may be a rendering protocol.

In some embodiments, the capability information of the terminal device includes at least one of the following: a rendering algorithm type supported by the terminal device and performance of the rendering algorithm, but are not limited thereto.

In some embodiments, the performance of the rendering algorithm includes at least one of the following: a video size, a frame rate, and a delay that are processable by the algorithm.

For example, a data structure of the rendering capability response data may be shown in Table 3.

TABLE 3

Data structure of rendering capability response data

| Rendering capability response data | Annotation |
|---|---|
| [render_ability] | Rendering capability |
| state = 0 | Successfully query and return a state code 0 |
| version = 1.0 | Terminal protocol version |
| renders = 1 | Support one video rendering algorithm, where specific information is in subsequent [render1] |
| [render1] | First piece of video rendering algorithm capability information |

TABLE 3-continued

Data structure of rendering capability response data

| Rendering capability response data | Annotation |
|---|---|
| type = 1 | render is video sharpening enhancement |
| performances = 1 | Perform video sharpening and enhancement by one performance, where information is in performance1 |
| performance1 = 8, 8, 10 | Video sharpening and enhancement and perform rendering for 10 ms to reach 1080 p@60 fps |

In some embodiments, the rendering capability of the terminal device may be classified into the following three cases.

Case 1: The terminal device has a complete rendering capability for the current image frame.

Case 2: The terminal device has a local rendering capability for the current image frame.

Case 3: The terminal device does not have a rendering capability.

In some embodiments, the rendering capability may be a video image processing capability. Different rendering capabilities of the terminal device may be defined through enumeration, as shown in Table 4.

TABLE 4

Rendering capability of a terminal device

| Rendering capability | Enumeration definition |
|---|---|
| Undefined | 0 |
| Without the rendering capability | 1 |
| With a local rendering capability | 2 |
| With a complete rendering capability | 3 |

S403. The cloud server performs video image acquisition on a video generated in real time, to obtain a video stream.

Performing video image acquisition on the video generated in real time may be performing acquisition according to a time sequence in which a video image occurs in the video. In some embodiments, each image frame in the video stream includes an image formed by a virtual game picture.

S404. The cloud server performs video image enhancement on a target region in each image frame in the video stream according to a rendering capability of a terminal device, to obtain an image-enhanced video stream, the target region including a region in which hopping occurs in a pixel value of a pixel in each image frame.

Specifically, the rendering capability of the terminal device includes the foregoing three cases: without a video image processing capability, with a partial video image processing capability, and with a complete video image processing capability.

In a case that the rendering capability of the terminal device is without the video image processing capability or with the partial video image processing capability, the cloud server performs video image enhancement on the target region in each image frame in the video stream, to obtain the image-enhanced video stream.

In a case that the rendering capability of the terminal device is with the complete video image processing capability, the cloud server may perform video image enhancement on the target region in each image frame in the video stream, to obtain the image-enhanced video stream, encode the image-enhanced video stream, to obtain a bitstream, and transmit the bitstream to the terminal device. In some embodiments, without performing video image enhancement, encoding may be directly performed, to obtain a bitstream, and the bitstream is transmitted to the terminal device. The terminal device performs image enhancement.

In some embodiments, in S404, the performing video image enhancement on the target region in each image frame in the video stream, to obtain the image-enhanced video stream may specifically include the following operations.

S4041. Perform image enhancement on the target region in each image frame in the video stream, to obtain an image-enhanced image frame corresponding to each image frame.

S4042. Obtain the image-enhanced video stream according to the image-enhanced image frame corresponding to each image frame.

Specifically, in a possible implementation, S4041 may specifically include the following operations.

S40411. Determine, for each image frame in the video stream, M texture boundary points included in the target region in the image frame, M being a positive integer.

In some embodiments, each texture boundary point of the M texture boundary points is determined in the following manner:

in a case that a gradient strength of a current pixel in the current image frame is greater than or equal to a preset threshold, determining the current pixel as the texture boundary point.

For example, a current pixel is I (x, y), and a pixel on the left side of the current pixel, a pixel on the lower side of the current pixel, and a pixel on the lower left side of the current pixel are respectively I (x+1, y), I (x, y+1), and I (x+1, y+1). A gradient strength of the current pixel I (x, y) is ((I (x, y)—I (x+1, y+1))$^2$+((I (x+1, y)—I (x+1, y+1))$^2$. If the gradient strength of the current pixel I (x, y) is greater than a preset threshold, the current pixel is determined as a texture boundary point.

In some embodiments, the manner of determining the texture boundary point may be further a manner in which a sobel operator, a canny detection algorithm, or the like is used. This is not limited in the disclosure.

S40412. Perform pixel enhancement on each texture boundary point of the M texture boundary points, to obtain M pixel-enhanced texture boundary points.

Specifically, in a possible implementation, the performing pixel enhancement on each texture boundary point of the M texture boundary points, to obtain M pixel-enhanced texture boundary points may specifically include:

performing pixel enhancement on each texture boundary point of the M texture boundary points in the following manners, to obtain the M pixel-enhanced texture boundary points:

determining an average pixel value of the texture boundary point, the average pixel value being an average pixel value of N pixels around the texture boundary point, and N being a preset positive integer; and performing pixel enhancement on the texture boundary point according to a pixel value of the texture boundary point and the average pixel value of the texture boundary point, to obtain a pixel-enhanced texture boundary point.

The average pixel value may be an average pixel value of N pixels around the texture boundary point. Determining of the N pixels may be related to a distance to the texture boundary point, and a closer distance indicates denser distribution.

In some embodiments, to reduce calculation complexity, the average pixel value may be further a weighted average value of N pixel sampling points in a preset figure formed by pixels around the texture boundary point by using the texture boundary point as a center. For example, the preset figure may be a square, a rectangle, or a diamond. In the N pixel sampling points, a weight of each pixel sampling point may be preset, for example, may be set according to a distance between the pixel sampling point and the texture boundary point. A smaller distance indicates a larger weight and larger impact on the enhancement effect of the texture boundary point.

In some embodiments, the pixel sampling points in the preset figure may be distributed evenly or may be distributed unevenly. For example, a distribution sparsity degree of the pixel sampling point in the preset figure may be in positive correlation with a distance between the pixel sampling point and the texture boundary point. A closer distance to the texture boundary point indicates denser sampling, and a longer distance to the texture boundary point indicates sparser sampling, to avoid introducing a relatively large quantity of pixel sampling points far away from the texture boundary point, which increase a calculation amount and cause the enhancement effect of the texture boundary point to be insignificant. Therefore, effective sampling of the pixel is implemented.

In some embodiments, a distribution sparsity degree of each pixel sampling point in the preset figure may be in positive correlation with a distance between the pixel sampling point and the texture boundary point. In a possible implementation, the preset figure is a K*K square, K≥5, and K is a positive odd number. The N pixel sampling points include: pixels located in odd-numbered rows and odd-numbered columns in the K*K square and pixels adjacent to the texture boundary point. In this manner, the pixel sampling points are evenly distributed in the K*K square. The calculation complexity is reduced, and a result without sampling is closer.

In some embodiments, in a possible implementation, the performing pixel enhancement on the texture boundary point according to a pixel value of the texture boundary point and the average pixel value of the texture boundary point, to obtain a pixel-enhanced texture boundary point may specifically include:

determining an enhanced pixel value according to the pixel value of the texture boundary point and the average pixel value of the texture boundary point, the enhanced pixel value being equal to a sum of the pixel value of the texture boundary point and a target value, and the target value being a product of a preset enhancement parameter and a difference between the pixel value of the texture boundary point and the average pixel value of the texture boundary point. In some embodiments, the calculation process may be represented by using a formula: s=m+T*(m−n), where s is the enhanced pixel value, m is the pixel value of the texture boundary point, n is the average pixel value of the texture boundary point, and T is the preset enhancement parameter. In some embodiments, T may be a value between 0 and 1.

adjusting the pixel value of the texture boundary point as the enhanced pixel value, to obtain the pixel-enhanced texture boundary point.

In some embodiments, a process of performing pixel enhancement on each pixel may be performed in parallel and has relatively high parallelism degree. Pixel enhancement processing may be performed on each texture boundary point independently, each texture boundary point does not have a sequence dependency relationship, and parallel processing may be performed by using a multi-core CPU or a GPU, to achieve an objective of parallel acceleration.

In some embodiments, blur degrees of a picture after a video is encoded are different under different bit rates, and the preset threshold of the gradient strength and the enhancement parameter may be set according to the bit rate.

S40413. Obtain the image-enhanced image frame corresponding to the image frame according to the M pixel-enhanced texture boundary points and a pixel outside the target region in the image frame.

In some embodiments, for detailed description of the pixel enhancement, reference may be made to the embodiment shown in FIG. 6. Details are not described herein again.

S405. The cloud server encodes the image-enhanced video stream, to obtain an encoded bitstream.

S406. The cloud server transmits the encoded bitstream to the terminal device.

S407. The terminal device performs video image display according to the encoded bitstream.

For example, the terminal device displays a virtual game picture according to the encoded bitstream.

In some embodiments, the cloud server may determine, according to a game type, a rendering function set to be enabled, and then determines an optimal rendering cooperation mode of a current device according to a device type and a rendering capability that are reported by the terminal device. A specific rendering cooperation policy may include: rendering region cooperation, rendering task cooperation, and video analysis cooperation.

The rendering region cooperation refers to a specific video enhancement task. Rendering regions of the cloud server and the terminal device are divided according to a computing power of the terminal device. The cloud server completes rendering before video encoding (processing before video encoding), and the terminal device completes rendering after video decoding (processing after video decoding).

Based on a rendering capability division condition of the terminal device, an assignment status of video image enhancement may be as follows.

Figure 11:
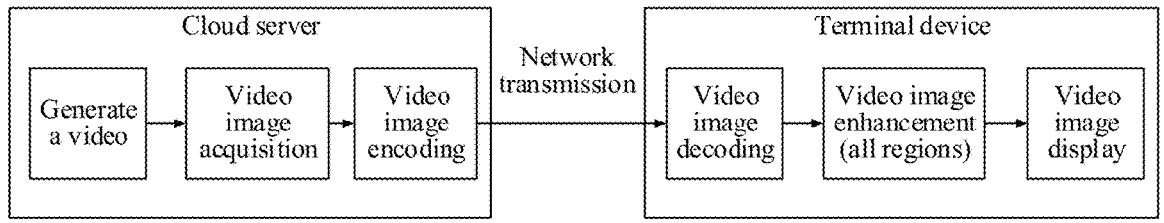
FIG. 11 is a schematic diagram of a video image processing process according to some embodiments.

In some embodiments, if the terminal device has a complete rendering capability for an image frame, video image enhancement may be completely completed by the terminal device. FIG. 11 is a schematic diagram of a video image processing process according to some embodiments. As shown in FIG. 11, a cloud server generates a video, performs video image acquisition, and encodes an acquired video image, to obtain an encoded bitstream of the video image. Further, the cloud server may send the bitstream to a terminal device. The terminal device performs video image decoding on the bitstream, then performs video image enhancement on all regions in the video image obtained through decoding, and finally displays the video image according to the enhanced video image.

Figure 12:
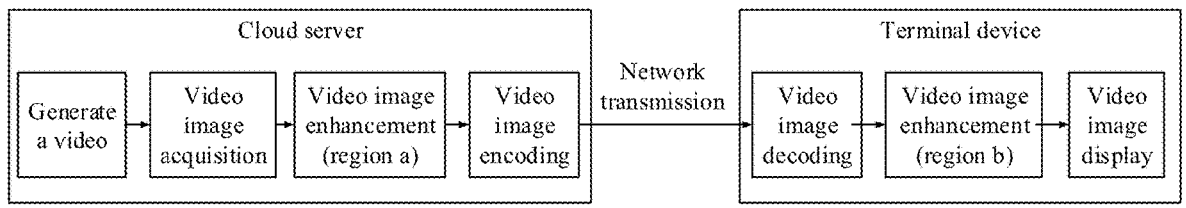
FIG. 12 is a schematic diagram of a video image processing process according to some embodiments.

If the terminal device has a partial rendering capability for an image frame, video image enhancement on a partial region may be completed by the cloud server, and video image enhancement on a partial region may be completed by the terminal device. FIG. 12 is a schematic diagram of a video image processing process according to some embodiments. As shown in FIG. 12, a cloud server generates a video, performs video image acquisition, performs video image enhancement on a region a in an acquired video image, and encodes a video image-enhanced video image, to obtain an encoded bitstream. Further, the cloud server may send the bitstream to a terminal device through a network. The terminal device decodes the bitstream, to obtain the video image, then performs video image enhancement on a region b in the video image, and finally displays the video image. In some embodiments, the cloud server may perform video image enhancement on the region a in the acquired video image by using the image enhancement method provided in some embodiments.

Figure 13:
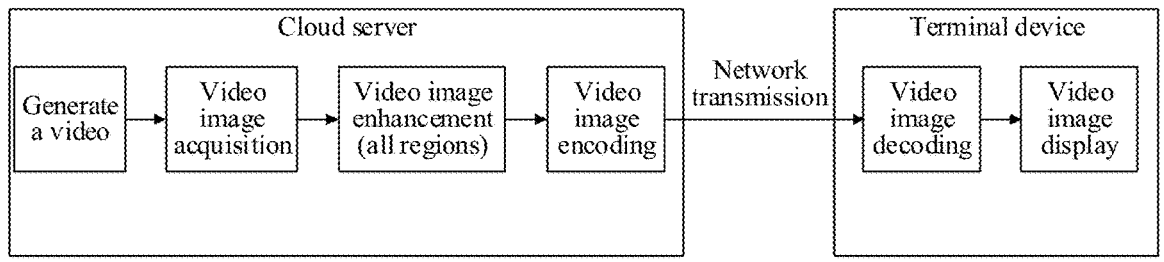
FIG. 13 is a schematic diagram of a video image processing process according to some embodiments.

If the terminal device does not have the rendering capability, video image enhancement is completed by the cloud server. FIG. 13 is a schematic diagram of a video image processing process according to some embodiments. As shown in FIG. 13, a cloud server generates a video, performs video image acquisition, performs image enhancement on all regions in an acquired video image, and then encodes a video image-enhanced video image, to obtain a bitstream of the video image. Further, the cloud server may send the bitstream to a terminal device through a network. The terminal device decodes the bitstream, and finally displays the video image obtained through decoding. In some embodiments, the cloud server may perform video image enhancement on all the regions in the acquired video image by using the image enhancement method provided in some embodiments.

The rendering task cooperation is oriented to a specific video enhancement task. This type of task may be divided into different independent sub-tasks, and each sub-task corresponds to different video image enhancement algorithms. For example, a video enhancement task A is formed by cascading three independent sub-tasks. In the rendering task cooperation, according to a computing power of the terminal device, some video image enhancement tasks are completed by the cloud server, and some other video image enhancement tasks are completed by the terminal device. The cloud server completes the video enhancement task before video encoding (processing before video encoding), and the terminal device completes the video enhancement task after video decoding (processing after video decoding).

According to the real-time communication method provided in some embodiments, before each image frame in a video stream is encoded, image enhancement is performed on a region in which hopping occurs in a pixel value of a pixel in the image frame, to obtain an image-enhanced image frame, and then the image-enhanced image frame is encoded, to obtain a bitstream for transmission, thereby improving definition of a video image after a video is encoded. In addition, image enhancement is performed on a texture recognizable by human eyes rather than all regions in the current image frame, with a relatively low encoding delay. It can ensure both a low delay transmission requirement and a degree of definition of a video picture.

Figure 14:
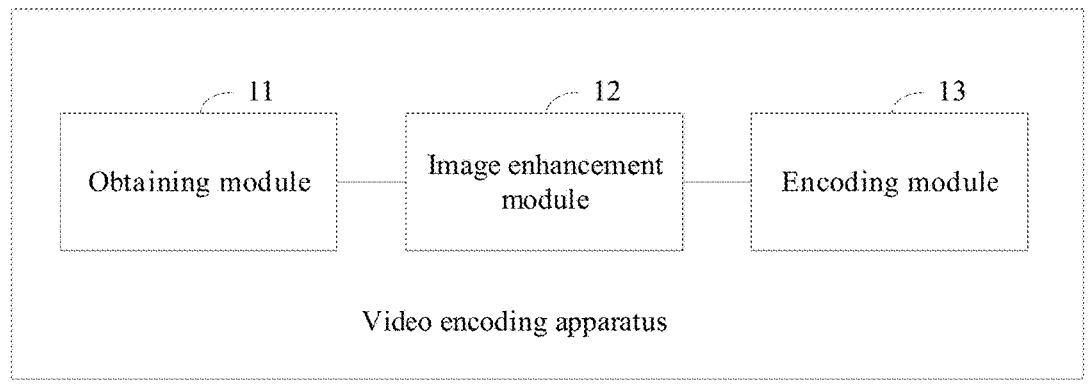
FIG. 14 is a schematic structural diagram of a video encoding apparatus according to some embodiments.

FIG. 14 is a schematic structural diagram of a video encoding apparatus according to some embodiments. As shown in FIG. 14, the video encoding apparatus may include: an obtaining module 11, an image enhancement module 12, and an encoding module 13.

The obtaining module 11 is configured to obtain a current image frame.

The image enhancement module 12 is configured to perform image enhancement on a target region in the current image frame, to obtain an image-enhanced image frame, the target region including a region in which hopping occurs in a pixel value of a pixel in the current image frame.

The encoding module 13 is configured to encode the image-enhanced image frame.

In some embodiments, the image enhancement module 12 is configured to determine M texture boundary points included in the target region in the current image frame, M being a positive integer;
perform pixel enhancement on each texture boundary point of the M texture boundary points, to obtain M pixel-enhanced texture boundary points; and
obtain the image-enhanced image frame according to the M pixel-enhanced texture boundary points and a pixel outside the target region in the current image frame.

In some embodiments, each texture boundary point of the M texture boundary points is determined in the following manner:
in a case that a gradient strength of a current pixel in the current image frame is greater than or equal to a preset threshold, determining the current pixel as the texture boundary point.

In some embodiments, the image enhancement module 12 is further configured to: perform pixel enhancement on each texture boundary point of the M texture boundary points in the following manners, to obtain the M pixel-enhanced texture boundary points:
determining an average pixel value of the texture boundary point, the average pixel value being an average pixel value of N pixels around the texture boundary point, and N being a preset positive integer; and
performing pixel enhancement on the texture boundary point according to a pixel value of the texture boundary point and the average pixel value of the texture boundary point, to obtain a pixel-enhanced texture boundary point.

In some embodiments, the average pixel value is a weighted average value of N pixel sampling points in a preset figure formed by pixels around the texture boundary point by using the texture boundary point as a center.

In some embodiments, a distribution sparsity degree of each pixel sampling point in the preset figure may be in positive correlation with a distance between the pixel sampling point and the texture boundary point. The preset figure includes at least one of a square, a rectangle, and a diamond.

In some embodiments, the preset figure is a K*K square, K≥5, and K is a positive odd number. The N pixel sampling points include: pixels located in odd-numbered rows and odd-numbered columns in the K*K square and pixels adjacent to the texture boundary point.

In some embodiments, the image enhancement module 12 is further configured to:
determine an enhanced pixel value according to the pixel value of the texture boundary point and the average pixel value of the texture boundary point, the enhanced pixel value being equal to a sum of the pixel value of the texture boundary point and a target value, and the target value being a product of a preset enhancement parameter and a difference between the pixel value of the texture boundary point and the average pixel value of the texture boundary point; and
adjust the pixel value of the texture boundary point as the enhanced pixel value, to obtain the pixel-enhanced texture boundary point.

It is to be understood that the apparatus embodiment may correspond to the method embodiment, and for similar description, reference may be made to the method embodiment. To avoid repetition, details are not described herein again. Specifically, the video encoding apparatus shown in FIG. 14 may execute the method embodiment corresponding to FIG. 4, and the foregoing and other operations and/or functions of modules of the video encoding apparatus are separately used for implementing the corresponding process of the method embodiment corresponding to FIG. 4. For brevity, details are not described herein.

Figure 15:
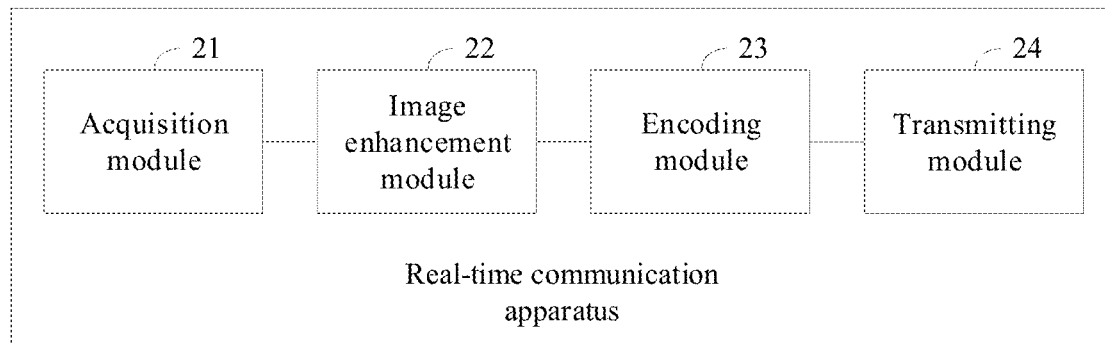
FIG. 15 is a schematic structural diagram of a real-time communication apparatus according to some embodiments.

FIG. 15 is a schematic structural diagram of a real-time communication apparatus according to some embodiments. As shown in FIG. 15, the real-time communication apparatus may include: an acquisition module 21, an image enhancement module 22, an encoding module 23, and a transmitting module 24.

The acquisition module 21 is configured to perform video image acquisition on a video generated in real time, to obtain a video stream.

The image enhancement module 22 is configured to perform video image enhancement on a target region in each image frame in the video stream according to a rendering capability of a terminal device, to obtain an image-enhanced video stream, the target region including a region in which hopping occurs in a pixel value of a pixel in each image frame.

The encoding module 23 is configured to encode the image-enhanced video stream, to obtain an encoded bitstream.

The transmitting module 24 is configured to transmit the encoded bitstream to a terminal device, so that the terminal device performs video image display according to the encoded bitstream.

In some embodiments, the transmitting module 24 is further configured to transmit a rendering capability inquiry request to the terminal device.

In some embodiments, the apparatus further includes a receiving module, configured to receive rendering capability response data fed back by the terminal device, the rendering capability response data including a rendering capability of the terminal device.

In some embodiments, the rendering capability includes: any one of without a video image processing capability, with a partial video image processing capability, and with a complete video image processing capability.

In some embodiments, the image enhancement module 22 is configured to: in a case that the rendering capability of the terminal device is without the video image processing capability or with the partial video image processing capability, perform video image enhancement on the target region in each image frame in the video stream, to obtain the image-enhanced video stream.

In some embodiments, the image enhancement module 22 is configured to: perform image enhancement on the target region in each image frame in the video stream, to obtain an image-enhanced image frame corresponding to each image frame; and obtain the image-enhanced video stream according to the image-enhanced image frame corresponding to each image frame.

In some embodiments, the image enhancement module 22 is further configured to: determine, for each image frame in the video stream, M texture boundary points included in the target region in the image frame, M being a positive integer; perform pixel enhancement on each texture boundary point of the M texture boundary points, to obtain M pixel-enhanced texture boundary points; and obtain the image-enhanced image frame corresponding to the image frame according to the M pixel-enhanced texture boundary points and a pixel outside the target region in the image frame.

In some embodiments, each image frame in the video stream includes an image formed by a virtual game picture.

It is to be understood that the apparatus embodiment may correspond to the method embodiment, and for similar description, reference may be made to the method embodiment. To avoid repetition, details are not described herein again. Specifically, the video encoding apparatus shown in FIG. 15 may execute the method embodiment corresponding to FIG. 9, and the foregoing and other operations and/or functions of modules of the video encoding apparatus are separately used for implementing the corresponding process of the method embodiment corresponding to FIG. 9. For brevity, details are not described herein.

The video encoding apparatus in some embodiments is described in the foregoing from the perspective of a function module with reference to the accompanying drawings. It is to be understood that the function module may be implemented in a form of hardware, or may be implemented through an instruction in a form of software, or may be implemented in a combination of a hardware module and a software module. Specifically, operations in the foregoing method embodiments in the embodiments of this application may be completed by using a hardware integrated logical circuit in the processor, or by using instructions in a form of software. Operations of the methods disclosed with reference to the embodiments of this application may be directly performed and completed by using a hardware decoding processor, or may be performed and completed by using a combination of hardware and a software module in the decoding processor. In some embodiments, the software module may be located in a mature storage medium in the field, such as a random access memory, a flash memory, a read-only memory, a programmable read-only memory, an electrically-erasable programmable memory, or a register. The storage medium is located in the memory. The processor reads information in the memory and completes the operations of the foregoing method embodiments in combination with hardware thereof.

Figure 16:
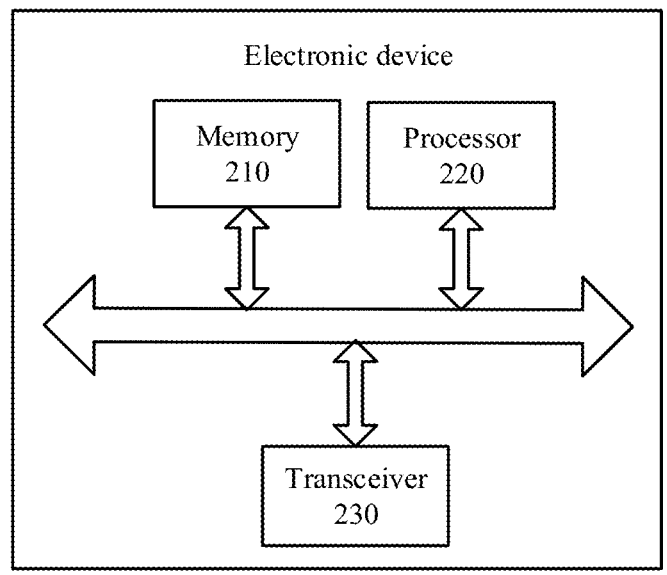
FIG. 16 is a schematic block diagram of an electronic device according to some embodiments.

FIG. 16 is a schematic block diagram of an electronic device according to some embodiments. The electronic device may be the server in the foregoing method embodiments.

As shown in FIG. 16, the electronic device may include:
a memory 210 and a processor 220. The memory 210 is configured to store configured to store computer-readable instructions and transmit the computer-readable instructions to the processor 220. The processor 220 may invoke the computer-readable instructions from the memory 210 and run the computer-readable instructions, to implement the method in the embodiments of this application.

For example, the processor 220 may be configured to perform the foregoing method embodiments according to instructions in the computer-readable instructions.

In some embodiments, the processor 220 may include, but not limited to,
a general-purpose processor, a digital signal processor (DSP), an application-specific integrated circuit (ASIC), a field programmable gate array (FPGA), or another programmable logical device, discrete gate or transistor logical device, or discrete hardware component, and the like In some embodiments of this application, the memory 210 includes, but not limited to,
a volatile memory and/or a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM).

In some embodiments of this application, the computer-readable instructions may be divided into one or more modules. The one or more modules are stored in the memory 210 and executed by the processor 220, to complete the method provided in this application. The one or more modules may be a series of computer-readable instruction sections that can complete a specific function, and the instruction section is used for describing an execution process of the computer-readable instruction in the electronic device.

As shown in FIG. 16, the electronic device may further include:
a transceiver 230, where the transceiver 230 may be connected to the processor 220 or the memory 210.

The processor 220 may control the transceiver 230 to communicate with another device, specifically, may send information or data to the another device, or receive information or data sent by the another device. The transceiver 230 may include a transmitter and a receiver. The transceiver 230 may further include an antenna, and a quantity of the antenna can be one or more.

It is to be understood that various components of the terminal device are connected to each other by a bus system. In addition to including a data bus, the bus system further includes a power bus, a control bus, and a status signal bus.

Some embodiments further provide a computer storage medium. The computer storage medium stores computer-readable instructions. When the computer-readable instructions are executed by a computer, the computer is enabled to perform the method in the foregoing method embodiments. Some embodiments provide a computer program product including instructions. When the instructions are executed by a computer, the computer is enabled to perform the method in the foregoing method embodiments.

When software is used to implement the embodiments, all or a part of the embodiments may be implemented in a form of a computer program product. The computer program product includes one or more computer instructions. When the computer-readable instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any available medium that a computer can access or a data storage device such as a server or a data center that includes one or more integrated available media. The available medium may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may be aware that, in combination with the examples described in the embodiments disclosed in this specification, modules and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it is not to be considered that the implementation goes beyond the scope of this application.

In the several embodiments provided, it can be understood that the disclosed system, apparatus, and method may be implemented in other manners. For example, the described apparatus is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network units. Some or all of modules may be selected to achieve the objective of the embodiment solutions according to an actual need. For example, functional modules in the embodiments of this application may be integrated into one processing module, or each of the modules may exist alone physically, or two or more modules are integrated into one module.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video encoding method, performed by a server, the video encoding method comprising:
   obtaining a current image frame;
   performing video image enhancement on a target region in the current image frame, to generate an image-enhanced image frame, the target region comprising a region in which hopping occurs in a pixel value of a pixel in the current image frame,
      wherein the performing the video image enhancement comprises enhancement of the target region on a pixel-by-pixel basis, and wherein enhancement of each respective pixel in the target region is based on a same pixel sampling pattern, the same pixel sampling pattern comprising pixels located in odd-numbered rows and odd-numbered columns in a predetermined square and pixels adjacent to the respective pixel, and
      wherein an enhanced pixel value of each respective pixel in the target region is based on a pixel value of the respective pixel and a preset pixel enhancement parameter, the preset pixel enhancement parameter being same for each respective pixel in the target region; and
   encoding the image-enhanced image frame.

2. The video encoding method according to claim 1, wherein performing the video image enhancement comprises:
   determining M texture boundary points in the target region, M being a positive integer;
   performing pixel enhancement on each of the M texture boundary points, to obtain M pixel-enhanced texture boundary points; and
   generating the image-enhanced image frame based on the M pixel-enhanced texture boundary points and a pixel outside the target region.

3. The video encoding method according to claim 2, wherein determining the M texture boundary points includes:
   when a gradient strength of a current pixel in the current image frame is greater than or equal to a threshold, determining the current pixel as the texture boundary point.

4. The video encoding method according to claim 2, wherein performing the pixel enhancement includes:
   determining an average pixel value of the texture boundary point, the average pixel value being an average pixel value of N pixels around the texture boundary point, and N being a positive integer; and
   performing the pixel enhancement on the texture boundary point according to a pixel value of the texture boundary point and the average pixel value of the texture boundary point, to generate a pixel-enhanced texture boundary point.

5. The video encoding method according to claim 4, wherein the average pixel value is a weighted average value of N pixel sampling points in a preset figure formed by the texture boundary point and pixels around the texture boundary point, and the texture boundary point is located at a central position of the preset figure.

6. The video encoding method according to claim 5, wherein a distribution sparsity degree of each pixel sampling point in the preset figure positively correlates with a distance between the pixel sampling point and the texture boundary point.

7. The video encoding method according to claim 5, wherein the preset figure is a K*K square wherein K is a positive odd number greater than or equal to 5; and
  the N pixel sampling points comprise: pixels located in odd-numbered rows and odd-numbered columns in the K*K square and pixels adjacent to the texture boundary point.

8. The video encoding method according to claim 4, wherein performing the pixel enhancement on the texture boundary point to generate the pixel-enhanced texture boundary point comprises:
  determining an enhanced pixel value based on the pixel value of the texture boundary point and the average pixel value of the texture boundary point,
  wherein the enhanced pixel value is equal to a sum of the pixel value of the texture boundary point and a target value, the target value is a product of the preset pixel enhancement parameter and a difference between the pixel value of the texture boundary point and the average pixel value of the texture boundary point; and
  changing the pixel value of the texture boundary point to the enhanced pixel value, to generate the pixel-enhanced texture boundary point.

9. The video encoding method according to claim 1, further comprising transmitting the encoded image-enhanced image frame to a terminal device.

10. The video encoding method according to claim 1, wherein the current image frame is an image from of a virtual game picture.

11. A video encoding apparatus, comprising:
  at least one memory configured to store computer program code; and
  at least one processor configured to operate as instructed by the computer program code, the computer program code comprising:
    frame obtaining code configured to cause the at least one processor to obtain a current image frame;
    frame generating code configured to cause the at least one processor to generate an image-enhanced image frame by performing video image enhancement on a target region in the current image frame, the target region comprising a region in which hopping occurs in a pixel value of a pixel in the current image frame
    wherein the performing the video image enhancement comprises enhancement of the target region on a pixel-by-pixel basis, and wherein enhancement of each respective pixel in the target region is based on a same pixel sampling pattern, the same pixel sampling pattern comprising pixels located in odd-numbered rows and odd-numbered columns in a predetermined square and pixels adjacent to the respective pixel, and
    wherein an enhanced pixel value of each respective pixel in the target region is based on a pixel value of the respective pixel and a preset pixel enhancement parameter, the preset pixel enhancement parameter being same for each respective pixel in the target region; and
    encoding code configured to cause the at least one processor to encode the image-enhanced image frame.

12. The video encoding apparatus according to claim 11, wherein performing the video image enhancement comprises:
  determining M texture boundary points in the target region, M being a positive integer;
  performing pixel enhancement on each of the M texture boundary points, to obtain M pixel-enhanced texture boundary points; and
  generating the image-enhanced image frame based on the M pixel-enhanced texture boundary points and a pixel outside the target region.

13. The video encoding apparatus according to claim 12, wherein determining the M texture boundary points includes:
  when a gradient strength of a current pixel in the current image frame is greater than or equal to a preset threshold, determining the current pixel as the texture boundary point.

14. The video encoding apparatus according to claim 12, wherein performing the pixel enhancement includes:
  determining an average pixel value of the texture boundary point, the average pixel value being an average pixel value of N pixels around the texture boundary point, and N being a positive integer; and
  performing the pixel enhancement on the texture boundary point based on a pixel value of the texture boundary point and the average pixel value of the texture boundary point, to generate a pixel-enhanced texture boundary point.

15. The video encoding apparatus according to claim 14, wherein the average pixel value is a weighted average value of N pixel sampling points in a preset figure formed by the texture boundary point and pixels around the texture boundary point, and the texture boundary point is located at a central position of the preset figure.

16. The video encoding apparatus according to claim 15, wherein a distribution sparsity degree of each pixel sampling point in the preset figure positively correlates with a distance between the pixel sampling point and the texture boundary point.

17. The video encoding apparatus according to claim 15, wherein the preset figure is a K*K square wherein K is a positive odd number greater than or equal to 5; and
  the N pixel sampling points are located in odd-numbered rows or odd-numbered columns in the K*K square, or located adjacent to the texture boundary point.

18. The video encoding apparatus according to claim 14, wherein performing the pixel enhancement on the texture boundary point to generate the pixel-enhanced texture boundary point includes:
  determining an enhanced pixel value based on the pixel value of the texture boundary point and the average pixel value of the texture boundary point,
  wherein the enhanced pixel value is equal to a sum of the pixel value of the texture boundary point and a target value, the target value is a product of the preset pixel enhancement parameter and a difference between the pixel value of the texture boundary point and the average pixel value of the texture boundary point; and
  changing the pixel value of the texture boundary point to the enhanced pixel value, to generate the pixel-enhanced texture boundary point.

19. The video encoding apparatus according to claim 11, further comprising transmitting code configured to cause the at least one processor to transmit the encoded image-enhanced image frame to a terminal device.

20. A non-transitory computer-readable-medium having stored thereon a computer program for video encoding, the computer program configured to cause one or more computer processors to:

obtain a current image frame;
perform video image enhancement on a target region in the current image frame, to generate an image-enhanced image frame, the target region comprising a region in which hopping occurs in a pixel value of a pixel in the current image frame,
   wherein the performing the video image enhancement comprises enhancement of the target region on a pixel-by-pixel basis, and wherein enhancement of each respective pixel in the target region is based on a same pixel sampling pattern, the same pixel sampling pattern comprising pixels located in odd-numbered rows and odd-numbered columns in a predetermined square and pixels adjacent to the respective pixel, and
   wherein an enhanced pixel value of each respective pixel in the target region is based on a pixel value of the respective pixel and a preset pixel enhancement parameter, the preset pixel enhancement parameter being same for each respective pixel in the target region; and
encode the image-enhanced image frame.

* * * * *